Aug. 4, 1964     H. W. RICE     3,142,966
VACUUM SERVO SYSTEM AND THE LIKE
Filed Nov. 24, 1961
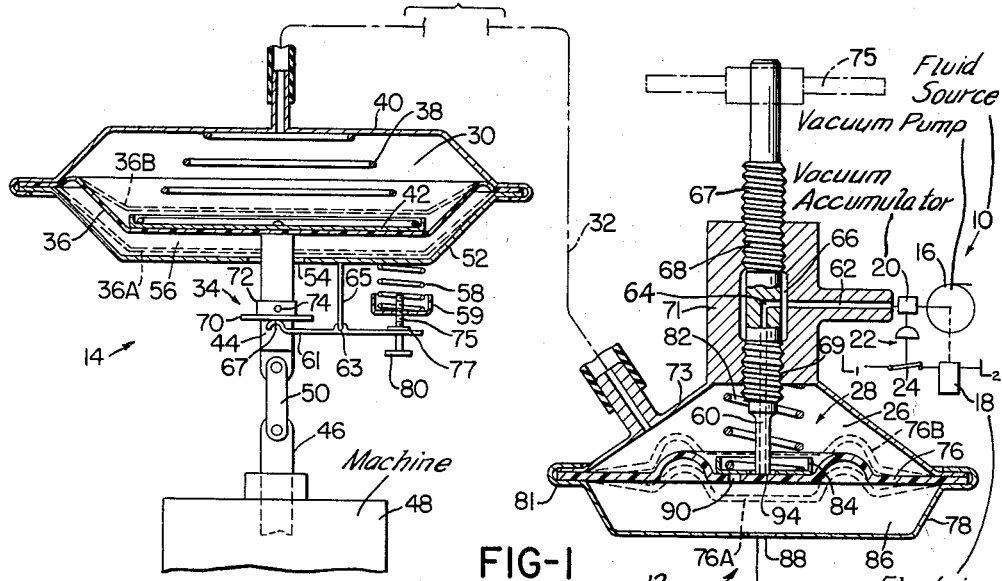
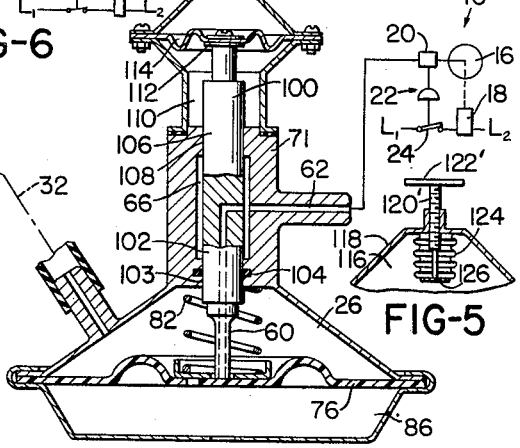
INVENTOR.
HAROLD W. RICE
BY Robert R. Cauder
ATTORNEY _United States Patent Office_

3,142,966
Patented Aug. 4, 1964

3,142,966
VACUUM SERVO SYSTEM AND THE LIKE
Harold W. Rice, Fullerton, Calif., assignor to Robertshaw Controls Company, a corporation of Delaware
Filed Nov. 24, 1961, Ser. No. 154,437
15 Claims. (Cl. 60—60)

This invention relates to vacuum servo systems and includes certain components thereof.

According to this invention a master controller is connectable to a slave member in such a manner that the master controller maintains a master vacuum chamber at a desired vacuum pressure while connected with a source of vacuum having a more powerful vacuum or fluid condition.

The vacuum pressure in the master vacuum chamber may be adjustable manually and/or thermostatically, as desired.

A slave member may be connected to the master controller and produces actuations on a device to be controlled under the command of the master controller.

The slave member may have a slave vacuum chamber which is connected in fluid flow relationship with the master vacuum chamber and operates an actuator in response to vacuum pressures in said chambers.

The slave member may be adjusted or calibrated to be differently responsive to any set of vacuum pressure conditions.

A plurality of slave members may be connected to a single master controller for simultaneous control by said controller.

The plurality of slave members may be individually adjusted to produce different or similar responses to the vacuum pressure in the master vacuum chamber.

The master controller may be controlled by a program controller to provide one or more timed operations.

The last named master controller may be used with one or more slave members, such members being individually adjustable if desired.

This provides a very flexible type of control capable of producing large or small control movements, depending on the selected size of the slave members. Equivalents of the foregoing systems, components and pressures may be used.

Accordingly, an object of this invention is to provide a system having one or more of the features herein disclosed.

Another object of this invention is to provide a master controller having one or more of the features herein disclosed.

Another object of this invention is to provide a slave member having one or more features herein disclosed.

Another object of this invention is to provide a master controller combined with a slave member and having one or more of the features herein disclosed.

Other objects are apparent from this description, the appended claims and/or the accompanying drawings in which:

FIGURE 1 is a diagrammatic representation of a vacuum servo system according to this invention.

FIGURE 2 is an enlargement of a portion of FIGURE 1, with the tube structure adjusted to a lower position.

FIGURE 3 is a view similar to FIGURE 2, with the tube structure in a raised position.

FIGURE 4 is a view of a servo system with thermostatic adjustment for the tube structure, and with a plurality of slave members connected to the master controller.

FIGURE 5 is a view of a portion of FIGURE 4 showing another embodiment of thermostatic adjustment.

FIGURE 6 is a diagrammatic representation of a program controller interposed between the vacuum source and one or more master controllers with their cooperating slave members.

Certain words are used in this application to indicate direction, relative position, etc. However, such words are used for the sake of brevity and clearness. It is understood that such words are used in connection with the specific direction, relative position, etc., as applied to the drawings only. It is understood that the devices themselves may have different directions and relative positions other than those specifically described and shown. Examples of such words are: "upper," "lower," "vertical," etc.

While the disclosure is made in connection with vacuum systems and components, many features of this invention may be used with positive pressures.

Referring to FIGURE 1, the system may include a source 10 of actuating fluid, such as air, under vacuum condition, a master controller 12, and a slave member 14. The vacuum source of actuating fluid under vacuum condition may include, for example, a vacuum pump 16, driven by an electric motor 18. If desired, a vacuum accumulator 20 may be provided in the form of a chamber of sufficient size. Automatic means may be provided to cause the vacuum in the chamber 20 to be maintained within desired limits. For example, a pressure responsive actuator 22 may open and close the switch 24 to start and stop the motor 18 and maintain the vacuum pressure in the accumulator 20 within desired upper and lower limits.

The master controller 12 may have a vacuum chamber 26 connected to said vacuum source 10 in actuating fluid flow relationship. Means 28 may be provided to automatically maintain actuating fluid in said master vacuum chamber 26 at a controlled vacuum condition. The slave member 14 may have a slave vacuum chamber 30 connected in fluid actuating flow relationship, as by the conduit 32, to the master vacuum chamber 26. If desired, the conduit 32 may maintain the fluid pressure in the chambers 26 and 30 substantially equal, under static conditions. A slave actuating means 34 may operate in response to vacuum conditions of the actuating fluid in said slave vacuum chamber 30.

The slave actuating means 34 may take the form of a diaphragm 36 forming part of the wall of the vacuum chamber 30. The diaphragm 36 may be downwardly pressed by a compression spring 38 which has its upper end engaging the vacuum chamber dome 40 and the diaphragm 36 at the lower end. If desired, a shallow cup 42 may be interposed between the spring 38 and the diaphragm 36 to distribute the pressures evenly. The diaphragm 36 may be connected to a rod or the like 44 which may be connected to the plunger 46 of the device, machine, or the like 48 to be actuated by the slave member 14. A suitable link or sleeve 50 may connect the rod 44 with the plunger 46. The lower casing member 52 may be provided with an opening 54 sufficiently large to permit the rod 44 to pass freely therethrough, and to provide an opening for the entrance or discharge of atmospheric air into the space 56 below the diaphragm 36.

If desired, adjustment of the pressure characteristics of the spring 38, and its effect upon the diaphragm 36 and plunger 44 may be made adjustable by providing a countercompression spring 58. The upper end of spring 58 may bear against the casing member 52 and the lower end of the spring 58 may be received by an adjusting cup 59. Means may be provided to impose the counterspring pressure on the shaft 44. Such means may take the form of a lever 61 which is fulcrumed at 63 by means of a supporting bracket 65 which is secured to the casing 52. One end of the lever 61 may engage at 67 a washer 70, or the like, which is fixed to the shaft 44 as by a collar 72 and pin 74. An adjusting screw 75 may threadedly engage the cup 59 and may be provided with a flange 77 which engages the right end of the lever 61. The screw may pass loosely through the right end of the lever 61 and may be provided with a turning and adjusting knob 80 to adjust the effect of the spring 58 on the shaft 44.

Turning the knob 80 adjusts the response of the position of the rod 44 to the pressure in chamber 30, so that various positions of the rod 44 may be obtained for a given pressure at 30 by the adjustment of the knob 80.

The slave member 14 may be used without the adjustment means 63, 65, 67, 72, etc., if desired, and when not needed.

The means automatically maintaining the fluid in the master vacuum chamber 28 at controlled vacuum condition may include an adjustable tube 60. The tube 60 is continuously connected to the suction tube 62 by the elbow 64 which is connected to the groove 66 and to the tube 62 regardless of the turning movement which may be imparted to the tube 60. The passage 62 may be connected to the accumulator 20 and/or the vacuum pump 16, as desired.

The upper part 67 of the tube 60, may be threaded at 68 and 69 in the upper collar 71 of the master casings 72 which forms part of the master vacuum chamber 26. The tube 60 may be adjusted vertically or longitudinally by turning the threaded engagement 68 by a handle 75 for manual adjustment.

The diaphragm 76 may form another wall of the vacuum chamber 26 and is responsive to the vacuum produced in the chamber 26. A lower casing 78 may be secured to the casing 73 and may secure the diaphragm 76 in the seam construction 81 between the casing members 73 and 78. A compression spring 82 may have its upper end engaging the collar 71, and its lower end engaging the cup 84 which in turn engages the diaphragm 76 and imposes the spring pressure on the diaphragm 76.

The space in the chamber 86 may be at atmospheric pressure, obtained by the entrance of atmospheric air through the opening 88.

The full line position of the diaphragm 76 in FIGURE 1 is a static condition. However, adjustment of the tube 60 downwardly, as shown in FIGURE 2, causes the static condition of the diaphragm 76 to be changed to a selected position, such as 76A, which is shown in dotted lines in FIGURE 1. Adjustment of the tube 60 to a higher position than that shown in FIGURE 1, such as shown in FIGURE 3, causes the diaphragm 76 to assume an upper static condition, such as indicated by the dotted lines 76B in FIGURE 1.

The position 76B of the diaphragm is caused by the pressure in chamber 26 having been adjusted to a lower vacuum pressure, or stronger vacuum effect, or stronger sucking action. This lower vacuum pressure is transmitted through the conduit 32 to the slave chamber 30 so the new static pressure in chamber 30 may be substantially equal to that of the pressure in chamber 26. When the lower vacuum pressure in chamber 26 causes the diaphragm 76 to move to position 76B the diaphragm 36 in the slave chamber 30 assumes a corresponding upper position, such as 36B. This causes the rod 44 to assume an upper static position.

Likewise, when a higher vacuum pressure, or weaker vacuum effect or weaker sucking action is obtained in the chamber 26, the diaphragm 76 assumes the position 76A. Such higher vacuum pressure is transmitted through the tube 32 into the slave chamber 30, whereupon the diaphragm 36 assumes a lower position, such as 36A, thereby causing the shaft 44 to assume a lower static position when the diaphragm 76 is in the lower position 76A.

The vacuum pressure in chamber 26 may be adjusted to obtain a higher diaphragm position, such as 76B, by adjusting the tube 60 to an upper position, such as shown in FIGURE 3.

The diaphragm 76 may have a bleed hole 90. The cup 84 may be a cover member covering the hole 90 under the normal or static conditions. The cup 84 may have an opening 92 offset from the hole 90. The spring 82 presses against the cover member or cup 84 to hold the cover member 84 normally against the diaphragm 76 in hole covering position to cover the hole 90, as shown in FIGURE 1.

However, when the tube 60 is adjusted to a lower position, as in FIGURE 2, the tube structure 60, which is connected to the vacuum source 10 pushes down through the opening 92 with the tube end 94 engaging with the diaphragm 76 so the end 94 may flex the diaphragm, as shown in FIGURE 2 to open the hole 90 to admit higher pressure fluid, or atmospheric air, into the chamber 26.

On the other hand, when the tube 60 is moved upwardly, the end 94 may temporarily be uncovered by the diaphragm to admit air from the master vacuum 94 of the tube may be covered by the diaphragm as chamber 26 into the tube 60 where it may flow toward in FIGURE 1, while the cover or cup 84 covers the the vacuum source 10. Under static conditions the end hole 90 to maintain substantially static fluid conditions in the master vacuum chamber as shown in FIGURE 1. Adjustment of the tube 60 to an upper position, such as shown in FIGURE 3, causes the static conditions to be changed to diaphragm position 76B with a lower vacuum pressure and stronger sucking action in the chamber 26.

The full line position of the diaphragm 76 shown in FIGURE 1 is a static position in which the vacuum pressure in chamber 26 plus the spring pressure of spring 82 statically balance the atmospheric pressure in chamber 86. Because of this balance, there is no tendency for the diaphragm 76 to move upwardly or downwardly unless some leakage or other disturbance changes this balance condition.

When the tube 60 is moved downwardly, as in FIGURE 2, air enters through the openings 90 and 92 into the chamber 26 and produces a weaker vacuum effect in the chambers 26 and 30. The chambers 26 and 30 are connected by the tube 32 and hence the pressures in these chambers 26 and 30 are continuously equalized. This weaker vacuum effect in the chamber 26 produces a higher vacuum pressure more nearly equal to that of the atmospheric pressure in chamber 86. This high vacuum pressure plus the spring pressure 82 are therefore able to push the diaphragm 76 to the lower position 76A because of the higher total pushing power of the higher vacuum pressure and of the spring 82. Air continues to leak or bleed through the openings 90 and 92 until sufficient air has been introduced into the chambers 26 and 30 to push the diaphragms 76 and 36 to the lower positions 76A and 36A respectively. The distance downward to which the diaphragms 76 and 36 will move, will depend upon the new position of the tube 60, since the diaphragms 76 and 36 will come to equilibrium depending on the level of the end 94 of the tube 60. If too much air should accidentally be introduced into the chambers 26 and 30 through the openings 90 and 92, or by any leakage of any air into these chambers from any source, then the diaphragm 76 would be pushed down slightly below the end 94 of the tube 60 whereupon the vacuum source would withdraw air from the chambers 26 and 30 until the end 94 of the tube 60 is sealed by the new static position of the diaphragm at 76A.

If the tube 60 is moved upwardly from the position shown in FIGURE 1 to the position shown in FIGURE 3 then the end 94 of the tube 60 will be uncovered, and will permit air from the chambers 26 and 30 to enter the tube 60 and eventually enter the vacuum source 10 as through the accumulator chamber 20 and the pump 16. The pressure setting of the accumulator 20 by the switch 22, 24, is such that the vacuum in the accumulator 20 is always lower or stronger than any expected vacuum in chamber 26, so that whenever the end of the tube 94 is uncovered, the vacuum source 10 will always pull air out of the chamber 26, and the chamber 30. The withdrawal of air from the chambers 26 and 30 produces a lower vacuum pressure, which produces a stronger vacuum effect, or a stronger sucking action. The result is that the total pressure of the spring 82 and of the lower vacuum pressure in the chamber 26 is not as great as it was in the full line position of FIGURE 1, so that the atmosphere in chamber 86 can now push the diaphragm upwardly to the position 76B, and the diaphragm 36 to the position 36B in a gradual manner, until the diaphragm 76 reaches the new static condition 76B when the total of the spring pressure 82 and the lower pressure in chamber 26 balance the atmospheric pressure in chamber 86. When this new static condition 76B is reached, the end 94 of the tube 60 is sealed and remains sealed by the diaphragm 76 as long as there is no disturbing factor. If any disturbing factor is introduced, causing slight movement of the diaphragm 76 from the static condition, then an action will be produced of the same character as shown in FIGURES 2 or 3, until such time as the diaphragm is brought to the new static condition.

If desired, the spring 38 may be omitted from the chamber 30 and the adjusting construction 58, 59, 61, 70, 80, etc. may also be omitted. Instead a compression coil spring may be placed loosely around the shaft 44 with its upper end against the lower wall of member 52 with the spring surrounding the opening 54. The lower end of such spring may engage an adjustable washer similar to washer 70 loosely surrounding the shaft 44. Such washer may be longitudinally adjusted on the shaft 44 by a combined adjusting knob and nut threadedly engaging the shaft 44 and also engaging the lower surface of the said adjustable washer to push said washer up and down the shaft 44 against the compression force of the said compression coil spring.

One of the advantages of the use of the master controller 12 in combination with the slave member 14 is that a slave member 14 may be provided with a much larger or smaller diaphragm 36, and a much stronger or weaker spring 38, or the alternate spring just described and surrounding shaft 44. This enables the slave member 14 to produce relatively greater or relatively smaller movements in the member 44 than could be produced by a similar member 44 if connected to the diaphragm 76 without the use of a slave member. In addition, the responsiveness of the slave member 41 may be varied by varying the total spring pressures of the springs 38 and 58 by the turning of the knob 80 as previously described, or alternately by turning the combined adjusting knob and nut just described. Also, a plurality of slave members, as will be described in connection with FIGURE 4 may be connected to the single master member 12, so the single master member 12 may operate several different devices 48, and by the adjustment 80 or combined knob and nut, can operate such devices 48 in a differential manner by differentially adjusting the various knobs on the various slave members. Also, a single master member 12 with one or more slave members 14 attached thereto may be connected to a program member such as shown in FIGURE 6, so that one or more actuated devices 48 may be actuated at selected periods of time and at selected pressure actions determined by the adjustment of the individual turning knobs of the slave members. Also, the pressure action in the chamber 30 may be entirely different from the pressure in the accumulator 20 or the vacuum source 10, and the desired pressure so obtained may be regulated by the adjustment of the tube 60 and/or an adjusting knob, as desired.

FIGURE 4 shows a construction in which the master controller may be adjusted thermostatically All of the members of master controller of FIGURE 1 may be substantially the same in FIGURE 4, and many of the elements have been marked in FIGURE 4 with reference characters similar to those in FIGURE 1 and without repeating the description thereof since all of such parts so marked operate in substantially the same manner.

However, a plunger 100 in FIGURE 4 may take the place of the threaded construction 67, 68 and 69 of FIGURE 1. The main body of plunger 100 may be slidably received in the collar 71 instead of threadedly received therein. A lower plunger section 102 may slide in the lower bearing 103 and sealing construction 104 to provide a substantially sealed sliding construction to prevent any substantial amount of travel of air in or out at this point. The upper plunger construction 106 may be slidable in the upper bearing 108 with or without any sealing action. If desired, there may be a small groove, not shown, which may connect with the groove 66 which may be otherwise substantially the same as shown in FIGURE 1. In this manner the sealed chamber 110 may be maintained at any pressure, and conveniently it may be maintained at the same pressure as is produced in groove 66 by the source of vacuum 10. The upper end 112 of the plunger 100 may be secured in sealed condition to a metallic diaphragm 114 which, alternately may be more or less cylindrical bellows, if desired. A thermostatic liquid chamber 116 may be formed by the walls 118 and the same may be sealed at the point 120 or, alternatively, it may be connected by relatively non-expansible tubing 122 with a thermostatic bulb 124. The bulb 124 preferably is much larger in relationship to the chamber 116 and contains the major part of the thermostatic liquid to be used in the thermostatic construction. If the thermostatic chamber 116 is sealed at 120, and no thermostatic bulb is used, then the master controller of FIGURE 4 may be placed in the space wherein the temperature is to control the action of the master controller 12A. Since the thermostatic material is liquid, it is incompressible, and imposes its expansion and contraction under temperature changes substantially unmodified by the gaseous pressure in chamber 110, except for some slight yielding action which may take place in the parts which go into the bounding or containing of the chamber 116. The thermostatic liquid may be any of the well known thermostatic liquids used in liquid thermostats which are used, for example, to control domestic range ovens and the like.

The plunger 100 is connected to and may be a part of the tube 60, so that expansion and contraction of the thermostatic liquid in chamber 116 moves the tube 60 up and down in response to temperature changes which may be affecting the chamber 116 when the chamber is sealed at 120 or the plunger 100 may be moved up and down in response to temperatures affecting the bulb 124 without substantial modification, if the bulb 124 is sufficiently large, except that some slight environmental temperature around space 116 may slightly modify the action, as is well known with respect to liquid thermostats of this character. Generally such slight environmental change is immaterial when the bulb 124 is sufficiently large.

When the temperatures which affect the liquid in chamber 116 become lower, then the liquid in chamber 116 contracts and thus allows the diaphragm or bellows 114 to move upwardly and also the tube 60 to a position corresponding substantially to that shown in FIGURE 3. When this happens, the action described in connection with FIGURE 3 will take place, so the diaphragm 76 and the diaphragm 36 will move upwardly to the positions 76B and 36B which are shown in FIGURE 1.

If the temperature surrounding the chamber 116 or the bulb 124 should become higher, then the expansion of the liquid in the chamber 116 will push the diaphragm or bellows 114 downwardly and correspondingly push the tube 60 downward to the position shown in FIGURE 2. When this happens, the action which has been described in connection with FIGURE 2 takes place so that the diaphragm 76 and the slave diaphragm 36 move downwardly and become in static condition at a position corresponding to 76A and 36A of FIGURE 1.

It is deemed unnecessary to repeat the description concerning the various cooperations which take place between the master controller and the slave member when the tube 60 is raised or lowered or is maintained stationary.

If desired, a seal similar to seal 104, or a bellows seal may be provided between the plunger 106 and the collar 71. The chamber 110 may then be placed under atmospheric pressure by providing one or more openings in the casing surrounding the chamber 110. Also, if desired, a compression spring, such as a coil spring, may be provided between the diaphragm or bellows 114 and the top of the collar 71.

Also, if desired, any other type of thermostatic actuator may be used for the plunger 100 instead of the liquid type of thermostatic actuators shown in FIGURES 4 and 5. For example, a bi-metal thermostat, a tube and rod thermostat, etc., may be used instead of the liquid actuator in chamber 116.

The master controller 12A of FIGURE 4 may be connected by the line 32 with a single slave member 14A, so the action between the master controller 12A and the single slave member 14A will be substantially identical with that previously described in connection with FIGURE 1. If desired, the action of the slave member 14A may be modified by turning the knob 80A, so that modification will take place substantially identical to that described in connection with the slave member 14 of FIGURE 1.

The master controller 12A of FIGURE 4, or the master controller 12 of FIGURE 1, may be connected by line 32A with one or more additional slave members 14B, 14C, etc. These slave members 14B, 14C, etc. may be connected by a single line, or parallel lines, with the master vacuum chamber 26. The change in pressure in the master vacuum chamber 26 in turn modifies the pressure in the slave vacuum chamber 30 of all of the slave members which are connected with the master controller. The additional slave members may be modified by turning the knobs 80B and 80C to cause a modification substantially identical with that described and disclosed in connection with the slave member 14 of FIGURE 1. In this manner, the plurality of slave members 14A, 14B, 14C, etc., may all be controlled from a single master member 12 or 12A and slightly different and modified reactions or movements or identical movements, as desired may be produced by the slave members 14A, 14B, 14C, etc., as adjusted by the knobs 80A, 80B, and 80C. The switch construction 22 and 24, of FIGURE 4, as well as of FIGURE 1 may be calibrated, so that it produces a stronger vacuum effect or suction action than is required to withdraw air from the chamber 26 under all expected conditions.

It is to be noted that the member 12A, when connected with a plurality of slave members may not change the action of the diaphragms as quickly as would be the case with a single slave member, but it is to be understood that the air changing capacity will be made sufficiently effective to obtain the desired reaction.

The thermostatic control of the master controller, such as controller 12A may be calibrated or set for any desired temperature. For example, when the space or chamber 116 of FIGURE 4 is made to operate without a bulb 124, a setting screw 120' may be threaded in the casing 118 and may be provided with a knob 122' for adjusting the screw 120' inwardly into and outwardly from the chamber 116. In addition, the screw may be sealed against leakage of the liquid by any suitable means. For example, a bellows 124 may be sealingly secured to the casing 118, and the lower end of the screw 120' may be rotationally received at the bottom 126 of the bellows 124. Inward and outward adjustment of screw 120' produces a modified result in the action of the master controller 112A in response to any set of surrounding temperatures.

FIGURE 6 shows one or more master controllers 12F, 12G, etc., connected to the source of vacuum 10 through the medium of a program controller 130. The program controller 130 may be of any type which connects the source of vacuum 10 which may be identical with that shown in FIGURES 1 and 4, sequentially with the master controllers 12F, 12G, etc. through the medium of passageways 62F and 62G. The vacuum source 10 produces a stronger vacuum than any required in the operation of the connected members. The construction is such that the program controller 130 produces sequential connections with the source of vacuum 10 and with the slave vacuum chambers in the slave members 14F and 14G, as well as with the master vacuum chambers 26 of the master controllers 12F and 12G. When this occurs, proper vacuums are produced in the various chambers 26 and 30 in proper sequences and for the desired periods of time. At the end of any desired period of time for a sequence, the program controller 130 may break the vacuum to the corresponding master controller 12F, 12G, etc., whereupon air is admitted to the chambers 26 and 30, so that the chambers 26 and 30 have atmospheric pressures produced in them. Under these conditions, the respective springs 82 and 38 may push the respective diaphragms 76 and 36 completely downward to the lowermost position, which may be a position which stops operation of the control device 48F or 48G, or otherwise places them in whatever condition is desired when no impulse is being received from the program controller 130.

By the construction of FIGURE 6 a plurality of machines 48F and 48G or members of a machine, may be controlled for operation at desired times by the program controller 130. The individual machines 48F and 48G or members of a machine may be differently operated by the adjustment of the slave members through the knobs corresponding to 80 in FIGURE 1. The master controllers and slave controllers may be modified by the manual means corresponding to 75 in FIGURE 1 or by the thermostatic means 116 in FIGURES 1 and 4.

It is thus to be seen that improved control systems have been provided. Master controllers have also been provided which are used with slave members in a manner to produce large or small movements in the devices to be controlled in an efficient and economical manner. The controllers may be manually or thermostatically controlled. Efficient controls may be provided at relatively long distances, as desired. Many other advantages are provided.

These features are individually and collectively new and useful.

While the form of the invention now preferred has been disclosed as required by statute other forms may be used, all coming within the scope of the claims which follow.

What is claimed is:

1. A combination for use with a vacuum source of actuating fluid under vacuum condition and the like: a master controller having a master vacuum chamber connectable to said vacuum source in actuating fluid flow relationship; first means automatically maintaining actuating fluid in said master vacuum chamber at a controlled vacuum condition; a slave member having a slave vacuum chamber connected in actuating fluid flow relationship to said master vacuum chamber; and a slave actuating means operating in response to vacuum condition of actuating fluid in said slave vacuum chamber in which combination said first means is adjustable to produce a plurality of different controlled vacuum conditions in said master vacuum chamber and in which said slave vacuum chamber is resiliently hermetically sealed with pressure characteristics to resist contraction by the vacuum conditions in said slave vacuum chamber, and in which said second means is a resilient second means outside said slave vacuum chamber and is adjustable outside said slave vacuum chamber to vary the response of said pressure characteristics to vacuum condition in said slave vacuum chamber independently of said first means.

2. A combination according to claim 1 in which said first means is manually adjustable and said resilient second means is manually adjustable independently of said first means.

3. A combination according to claim 1 in which said first means is thermostatically adjustable.

4. A combination according to claim 3 in which said resilient second means is manually adjustable to obtain a plurality of conditions of operation of said slave member.

5. A combination according to claim 1 in which more than one similar slave members are connected in actuating fluid flow relationship to said master vacuum chamber and each slave member has an independently variable resilient second means.

6. A combination for use with a vacuum source of actuating fluid under vacuum condition and the like: a master controller having a master vacuum chamber connectable to said vacuum source in actuating fluid flow relationship; first means automatically maintaining actuating fluid in said master vacuum chamber at a controlled vacuum condition; a slave member having a slave vacuum chamber connected in actuating fluid flow relationship to said master vacuum chamber; and a slave actuating means operating in response to vacuum condition of actuating fluid in said slave vacuum chamber and in which combination said first means comprises: a diaphragm forming a wall for said master vacuum chamber with a bleed hole; a cover member covering said hole and having an opening offset from said hole; spring means pressing against said cover member to hold said cover member normally against said diaphragm in hole covering position; and a tube structure connected to said vacuum source and passing through said opening with its end engaging said diaphragm so that said end may flex said diaphragm to open said hole to admit higher pressure fluid into said chamber under certain conditions, so that said end may be uncovered by said diaphragm to admit fluid from said master vacuum chamber into said tube toward said vacuum source, and so that said end of said tube may be covered by said diaphragm while said cover member covers said hole to maintain substantially static fluid conditions in said master vacuum chamber.

7. A combination according to claim 6 in which said tube structure is longitudinally adjustable to vary the static fluid pressure in said master vacuum chamber.

8. A combination according to claim 7 in which said tube structure is manually adjustable.

9. A combination according to claim 7 in which said tube structure is thermostatically adjustable.

10. A combination according to claim 1 in which a program controller is interposed between said vacuum source and said master vacuum chamber to connect and disconnect said vacuum source and said master vacuum chamber in a program sequence.

11. A combination according to claim 10 in which a second master vacuum chamber of a second master controller is connected to said program controller to connect and disconnect said vacuum source and said second master vacuum chamber in a program sequence.

12. A combination for use with a vacuum source of actuating fluid under vacuum condition and the like and with a slave member and the like having a slave vacuum chamber comprising: a master controller having a master vacuum chamber connectable to said vacuum source in actuating fluid flow relationship and with said slave vacuum chamber in actuating fluid flow relationship; and means automatically maintaining actuating fluid in said master vacuum chamber at a controlled vacuum condition, and in which said means comprises: a diaphragm forming a wall for said master vacuum chamber with a bleed hole; a cover member covering said hole and having an opening offset from said hole; spring means pressing against said cover member to hold said cover member normally against said diaphragm in hole covering position; and a tube structure connected to said vacuum source and passing through said opening with its end engaging said diaphragm so that said end may flex said diaphragm to open said hole to admit higher pressure fluid into said chamber under certain conditions, so that said end may be uncovered by said diaphragm to admit fluid from said master vacuum chamber into said tube toward said vacuum source, and so that said end of said tube may be covered by said diaphragm while said cover member covers said hole to maintain substantially static fluid conditions in said master vacuum chamber.

13. A combination according to claim 12 in which said tube structure is longitudinally adjustable to vary the static fluid pressure in said master vacuum chamber.

14. A combination according to claim 13 in which said tube structure is manually adjustable.

15. A combination according to claim 13 in which said tube structure is thermostatically adjustable.

References Cited in the file of this patent
UNITED STATES PATENTS

| | | |
|---|---|---|
| 974,286 | Matchette et al. | Nov. 1, 1910 |
| 1,745,707 | Perrett | Feb. 4, 1930 |
| 2,383,277 | Stevens | Aug. 21, 1945 |
| 2,457,874 | Davis | Jan. 4, 1949 |
| 2,961,833 | Schwartz | Nov. 29, 1960 |